United States Patent [19]

Watanabe et al.

[11] Patent Number: 5,634,690
[45] Date of Patent: Jun. 3, 1997

[54] BUCKLE RETRACTOR

[75] Inventors: Yasutaka Watanabe; Kenji Matsui; Hideki Tanaka, all of Aichi-ken, Japan

[73] Assignee: Kabushiki Kaisha Tokai-Rika-Denki-Seisakusho, Aichi-ken, Japan

[21] Appl. No.: 362,115

[22] Filed: Dec. 22, 1994

[30] Foreign Application Priority Data

Jan. 11, 1994 [JP] Japan .................. 6-001289

[51] Int. Cl.⁶ ........................... B60R 22/46
[52] U.S. Cl. ................. 297/480; 242/374; 280/805; 280/806
[58] Field of Search .................. 297/480; 242/374; 280/805, 806

[56] References Cited

U.S. PATENT DOCUMENTS

| | | | |
|---|---|---|---|
| 3,043,093 | 7/1962 | Stott | 280/806 |
| 4,398,680 | 8/1983 | Ogawa et al. | 297/480 |
| 5,004,178 | 4/1991 | Kobayashi et al. | 242/374 |
| 5,031,737 | 7/1991 | Dzioba et al. | |
| 5,058,462 | 10/1991 | Killiany et al. | |
| 5,174,409 | 12/1992 | Osawa | |
| 5,222,682 | 6/1993 | Nishizawa et al. | 242/374 |
| 5,338,065 | 8/1994 | Föhl | 297/480 |
| 5,423,598 | 6/1995 | Lane, Jr. et al. | 297/480 |

FOREIGN PATENT DOCUMENTS

| | | |
|---|---|---|
| 0315174 | 5/1989 | European Pat. Off. . |
| 0373368 | 11/1989 | European Pat. Off. . |
| 2491340 | 4/1982 | France ................ 242/374 |
| 3329687 | 3/1985 | Germany . |
| 4226083 | 2/1994 | Germany . |
| 4337524 | 5/1994 | Germany . |
| 3262760 | 3/1990 | Japan . |
| 3292239 | 12/1991 | Japan . |
| 3121947 | 12/1991 | Japan . |
| 4103453 | 4/1992 | Japan . |
| 4126665 | 4/1992 | Japan . |
| 554117 | 7/1993 | Japan . |
| 6249227 | 9/1994 | Japan . |
| 9000236 | 10/1990 | WIPO . |

OTHER PUBLICATIONS

International Search Report.

*Primary Examiner*—Peter M. Cuomo
*Assistant Examiner*—Anthony D. Barfield
*Attorney, Agent, or Firm*—Sixbey Friedman Leedom & Ferguson; Thomas W. Cole

[57] ABSTRACT

When gas is generated in an emergency situation of a vehicle and a cylinder is driven, one of wires rotates a pulley via a small diameter portion of the pulley. For this reason, the other wire connected to a large diameter portion of the pulley has a length wound around the large diameter portion, which is longer than that of the one wire. A drive stroke of the cylinder is increased and transmitted to a seat belt buckle. As a result, even if the cylinder is of a small size, a long pulling stroke is applied to a seat belt.

17 Claims, 4 Drawing Sheets

BUCKLE RETRACTOR

BACKGROUND OF THE INVENTION

1. Field of the Invention

The present invention relates to a buckle retractor which, at the time of a sudden deceleration of a vehicle, retracts a buckle toward a lower side of a vehicle body to cause a webbing to be applied closely to an occupant.

2. Description of the Related Art

As means for causing a webbing to be applied closely to an occupant at the time of a sudden deceleration of a vehicle, there has been known, in addition to a webbing retractor, a mechanical buckle retractor, called an inner pretensioner, which retracts, toward a lower side of a vehicle body, a buckle engaged with a tongue plate which is mounted at an intermediate portion of the webbing.

One example of this type of buckle retractor is shown in FIG. 4. In a buckle retractor 70 shown in FIG. 4, a lock plate 76 is connected to an anchor portion 74 of a buckle 72. One end of a wire 80 is mounted at a lower end portion of the lock plate 76 via a connecting piece 78. An intermediate portion of the wire 80 is wound around a pulley 82 provided at a front side of a direction in which the buckle 72 is retracted, and the other end of the wire 80 is connected to a piston 86 disposed within a cylinder 84. The cylinder 84 is equipped with a gas generator 88 which operates at the time of a sudden deceleration of a vehicle so as to generate a large amount of gas. As a result, the piston 86 moves within the cylinder 84 and applies tension to the wire 80, so that the wire 80 is forcibly pull in and the lock plate 76 is retracted together with the buckle 72.

However, in the conventional buckle retractor 70 as described above, since the buckle 72 is retracted via the wire 80, there is needed for a moving stroke of the piston 86 which is the same length as the amount by which the buckle 72 is retracted. For this reason, the size of the cylinder 84 becomes large so that a large configuration space is required. Particularly, there exist drawbacks in that, in a small-size vehicle or the like, in which it is difficult to widely maintain a configuration space, assembling efficiency deteriorates.

The present invention was developed in light of the above circumstances and it is an object of the present invention is to provide a buckle retractor which can sufficiently maintain a space for the amount by which the buckle is retracted and which is of a small size so that a large configuration space is not required.

SUMMARY OF THE INVENTION

When tension from a drive source such as a cylinder is transmitted to a transmission means such as a wire, the tension is transmitted to a seat belt after a drive stroke of the drive source has been increased by a stroke increasing means. For this reason, even when the drive stroke of the drive source is small, a large moving stroke can be obtained for the seat belt.

As the stroke increasing means, a structure can be used in which wires respectively wound around a pulley having a small diameter portion and a large diameter portion are connected to the drive source and the seat belt, respectively, the small diameter portion is rotated by a driving force from the drive source, and the wire connected to the seat belt is wound around the large diameter portion. However, other various stroke increasing means can also be used: one of them is that a pair of gear wheels which mesh each other and have different pitch diameters are used, the small diameter gear being driven and the large diameter gear pulling a seat belt; another is that a link having different lengths from a center line of rotation is used, a short turning radius portion being driven and a long turning radius portion pulling a seat belt; and still other is that a cam is used.

DESCRIPTION OF THE PREFERRED EMBODIMENTS

Figure 1:
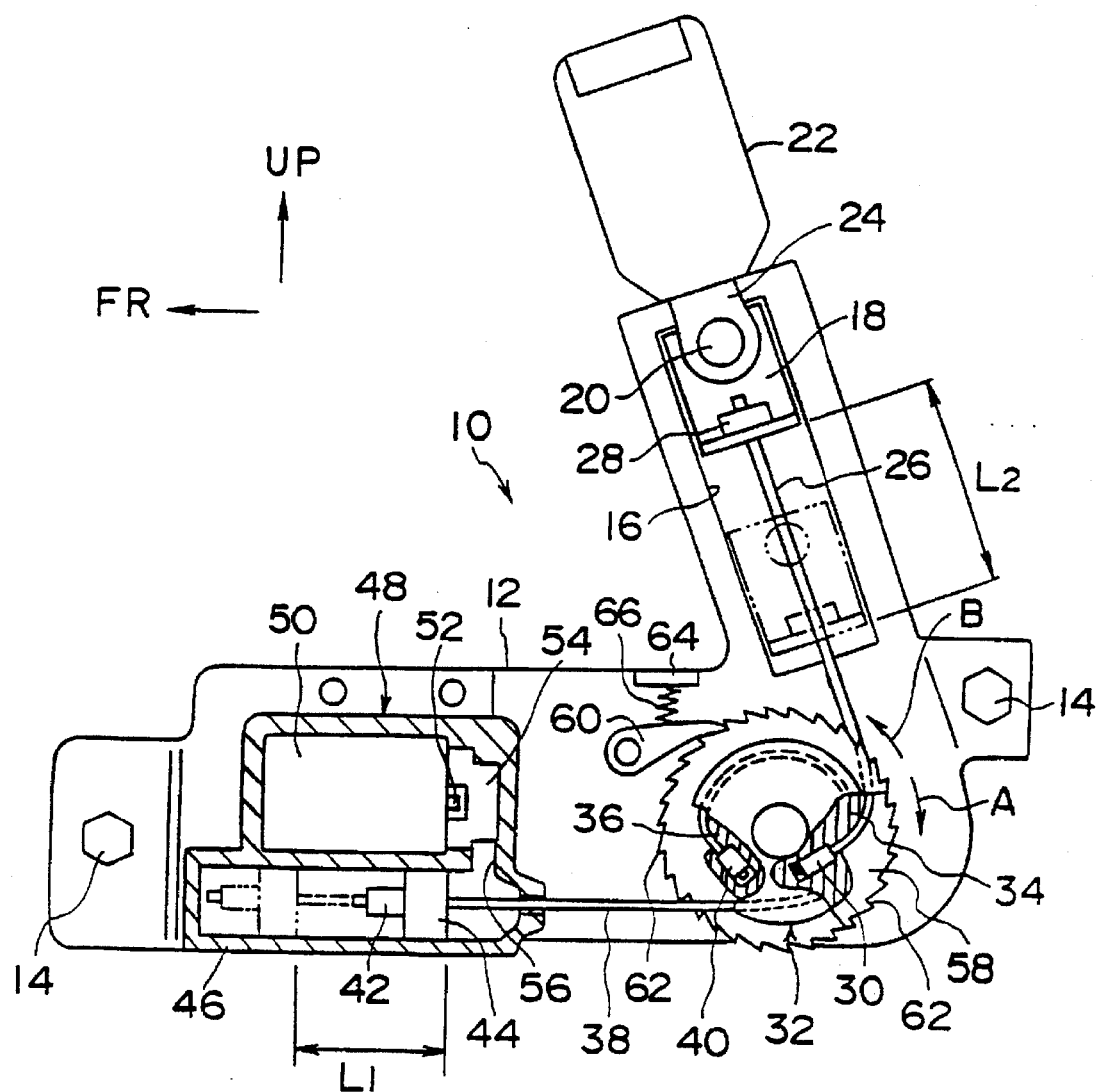
FIG. 1 is a partially broken front view illustrating an overall construction of a buckle retractor according to an embodiment of the present invention.
Figure 2:
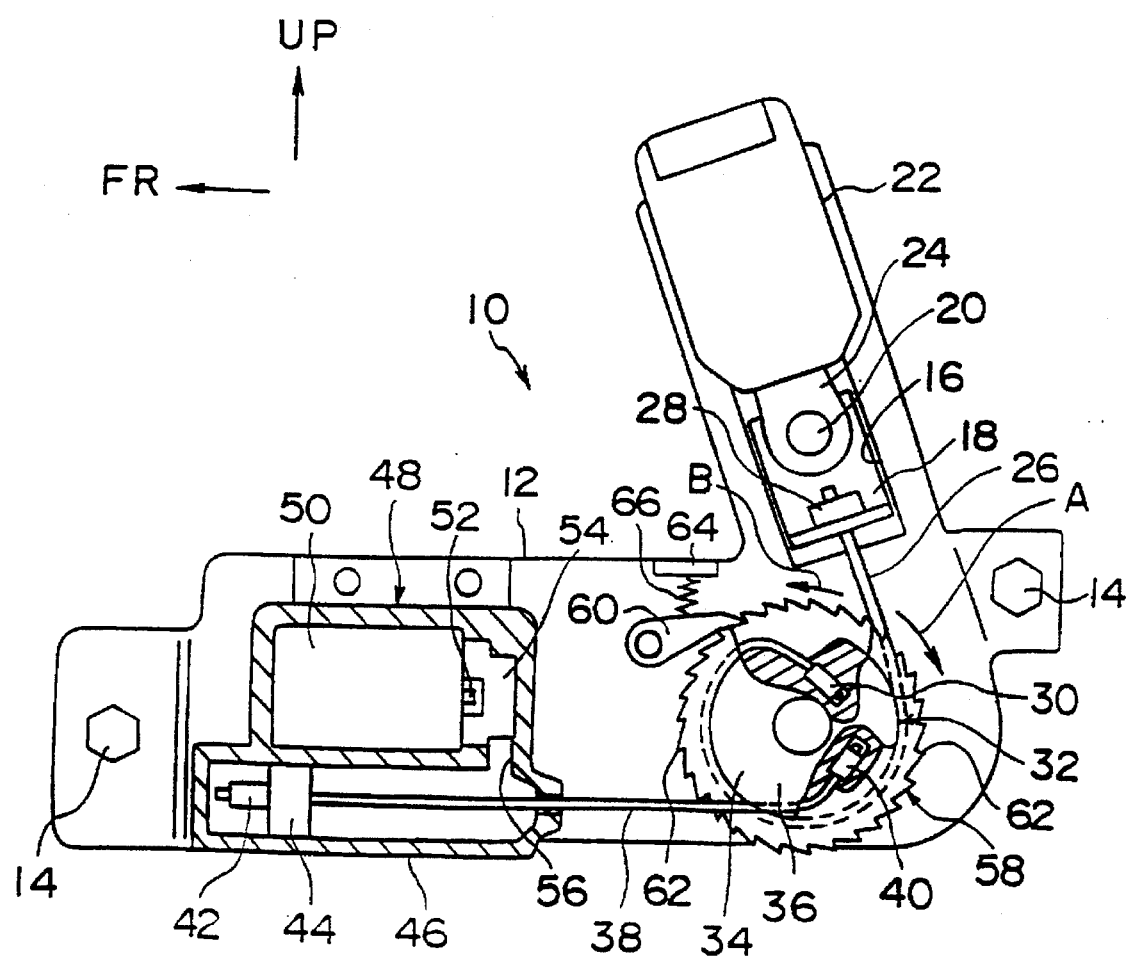
FIG. 2 is a front view corresponding to FIG. 1 and illustrating a state in which the buckle retractor according to the embodiment of the present invention is being actuated.
Figure 3:
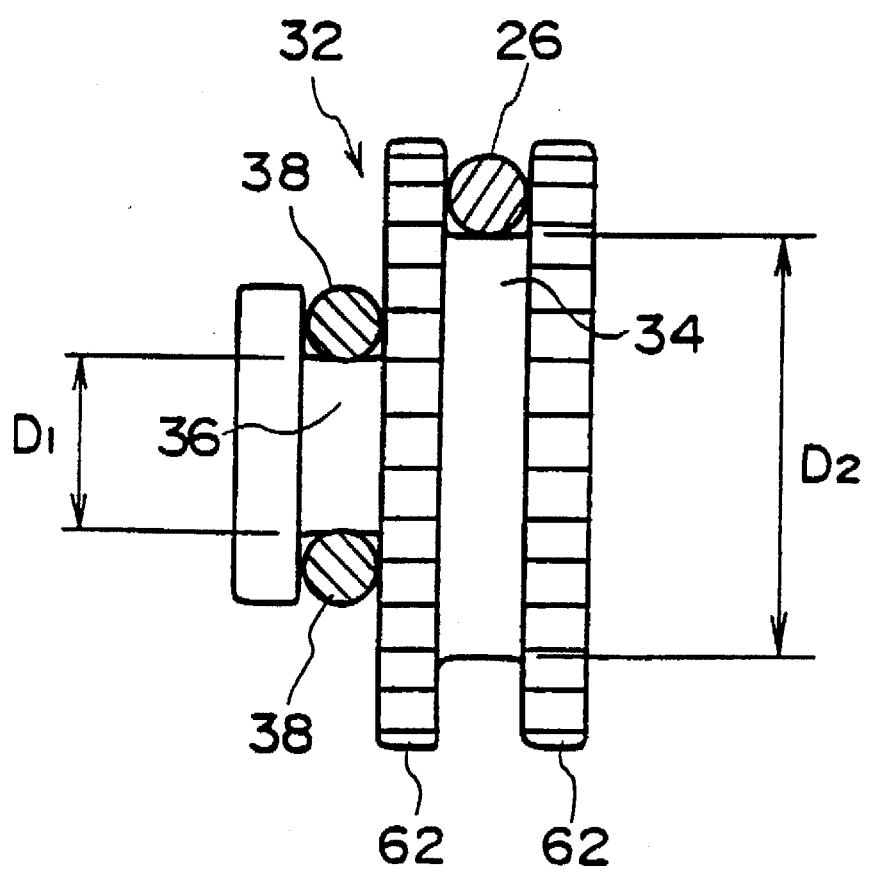
FIG. 3 is a side view illustrating a large diameter portion and a small diameter portion of a pulley of the buckle retractor according to the embodiment of the present invention.
Figure 4:
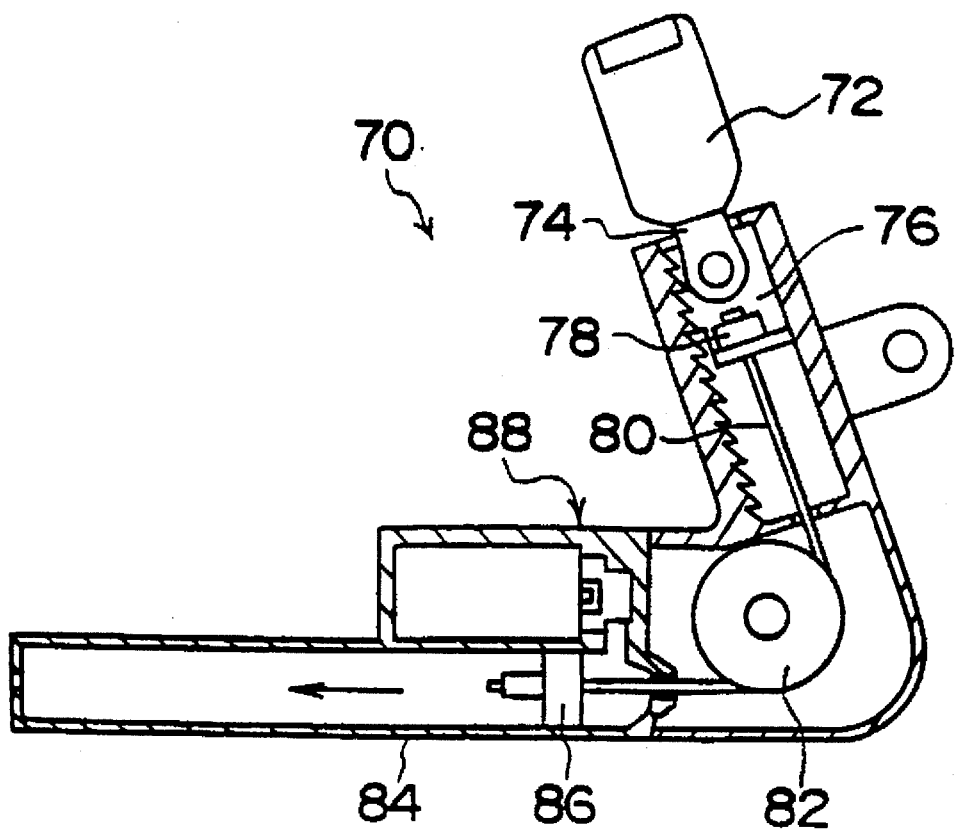
FIG. 4 is a cross-sectional view illustrating an overall construction of a conventional buckle retractor.

Referring now to FIG. 1 through FIG. 3, a description will be given of an embodiment of the present invention. Note that arrows "FR" and "UP" shown in the accompanying drawings, respectively represent the forward direction of a vehicle and the upward direction thereof.

FIG. 1 shows a partially broken front view of an overall construction of a buckle retractor 10 according to an embodiment of the present invention.

In FIG. 1, a main body portion 12 of the buckle retractor 10 is mounted to a side surface of an unillustrated occupant's seat by a bolt 14. An elongated rectangular guide portion 16 is formed at an end portion of the main body portion 12 at a rear side of a vehicle. A plate 18 is accommodated within the guide portion 16 so as to be movable. An anchor portion 24 of a buckle 22 is connected to an upper end portion of the plate 18 via a stepped bolt 20, so that the buckle 22 can be moved together with the plate 18. Further, one end of a wire 26 as a first wire is connected to a lower end portion of the plate 18 via a connecting piece 28, while the other end of the wire 26 is connected to a pulley 32 via a connecting piece 30.

The pulley 32 is formed into a two-step structure in which, as shown in FIG. 3, a large diameter portion 34 and a small diameter portion 36 are integrally provided. The pulley 32 is mounted to the main body portion 12 below the guide portion 16 so as to be rotatable. The above-described other end of the wire 26 is connected to the large diameter portion 34 of the pulley 32 via the connecting piece 30. Accordingly, when the pulley 32 rotates, the large diameter portion 34 can wind up the wire 26.

On the other hand, one end of a wire 38 as a second wire is connected to the small diameter portion 36 of the pulley 32 via a connecting piece 40. Further, one proximal end portion of the wire 38 is wound around the small diameter portion 35 by a predetermined length. Accordingly, when the wire 38 is pulled and the portion of the wire 38 being wound is pulled out, the pulley 32 is rotated.

The other end of the wire 38 wound around the small diameter portion 36 of the pulley 32 is connected to a piston 44 via a connecting piece 42.

The piston 44 is accommodated within a cylinder 46 fixed to a portion of the main body portion 12 at a front side of the vehicle, and can be moved together with the wire 38 within the cylinder 46. A gas generator 48 is disposed above the cylinder 46 at a rear-side lateral end portion of the vehicle. Accommodated within the gas generator 48 are an acceleration sensor 50 which senses a vehicle acceleration, and an inflator 54 with a detonator 52. The inflator 54 communicates with a space of the cylinder 46 at a back side of the piston 44 via a passage 56. As a result, when the gas generator 48 operates so that a large amount of gas is generated from the inflator 54, the gas flows from the passage 56 into a space within the cylinder 46 at the back side of the piston 44.

Further, a ratchet wheel 58 which forms a rotation preventing means is provided so as to be integrated with the outside of the above-described pulley 32. Moreover, a fastening pawl 60 is mounted to the main body portion 12 in the vicinity of the ratchet wheel 58 so as to face the ratchet wheel 58.

Sawtoothed external teeth 62 are formed around the ratchet wheel 58. The fastening pawl 60 engages with one of these external teeth 62. Namely, by causing the fastening pawl 60 to engage with these external teeth 62, only rotation of the ratchet wheel 58 (i.e., pulley 32 in a direction in which the wire 26 is retracted and a direction in which the wire 38 is withdrawn or pulled out (i.e., the direction of arrow A) is allowed, and the rotation thereof in a direction in which the wire 26 is pulled out and in a direction in which the wire 38 is retracted (i.e., the direction of arrow B) is prevented.

A compression spring 66 is interposed between the fastening pawl 60 and a bracket 64 of the main body portion 12 so that the fastening pawl 60 is constantly urged toward the external teeth 62 of the ratchet wheel 58.

Next, an operation of the present embodiment constructed as above will be described.

In the buckle retractor 10 having the above-described structure, during a normal running of a vehicle, the gas generator 48 is in a non-operating state and the fastening pawl 60 urged by the compression spring 66 engages with the external teeth 62 of the ratchet wheel 58. For this reason, the ratchet wheel 58, i.e., pulley 32, is prevented from rotating in the direction in which the wire 26 is pulled out and the direction in which the wire 38 is retracted (i.e., the direction of arrow B).

Accordingly, an occupant is reliably restrained by a webbing fastened to the buckle 22 via a tongue plate. It should be noted that, in order to reliably hold the buckle 22 at the position indicated in FIG. 1 during a normal running of the vehicle, an elastic member such as a plate spring may be provided between the plate 18 and the guide portion 16, or the plate 18 may be mounted to the main body portion 12 via a pin which is to be sheared off by a large load.

Here, when the vehicle is brought into a state of a sudden deceleration, the acceleration sensor 50 of the gas generator 48 operates so that the detonator 52 is ignited and a large amount of gas is generated from the inflator 54. The large amount of gas flows into the cylinder 46 at the back side of the piston 44 via the passage 55. As a result, the piston 44 disposed within the cylinder 46 is moved together with the wire 38. The movement of the piston 44 causes tension to be applied to the wire 38, and the pulley 32 is rotated (the direction of arrow A). Further, when the pulley 32 is rotated, tension is applied to the wire 25 and the plate 18 is moved along the guide plate 16 so that the buckle 22 is retracted. Accordingly, the webbing fastened to the buckle 22 via the tongue plate is applied closely to the occupant so that the occupant is reliably restrained.

Moreover, in this case, the fastening pawl 60 urged by the compression spring 66 engages with the external teeth 62 of the ratchet wheel 58, and the ratchet wheel 58, i.e., pulley 32, is prevented from rotating in the direction in which the wire 26 is pulled out and the direction in which the wire 38 is retracted (i.e., the direction of arrow B). For this reason, there is no possibility that the buckle 22 be pulled out again.

Here, the buckle 22 is connected to the large diameter portion 34 of the pulley 32 via the wire 26 and the piston 44 is connected to the small diameter portion 36 of the pulley 32 via the wire 38. For this reason, the moving stroke of the piston 44 is extended in accordance with the dimensional ratio of the small diameter portion 36 and the large diameter portion 34 and is transmitted to the buckle 22. As a result, it is sufficient that the moving stroke of the piston 44 for maintaining the amount by which the buckle 22 is retracted is markedly small.

Namely, assuming that the moving stroke of the piston 44 is L1, the required amount by which the buckle 22 is retracted is L2, the outer diameter dimension of the small diameter portion 36 of the pulley 32 is D1, and the outer diameter dimension of the large diameter portion 34 of the pulley 32 is D2, the following relation is expressed:

$$L1 = D1/D2 \times L2.$$

In this case, since D1<D2, it is given L1<L2.

In this way, it is sufficient that the moving stroke of the piston 44 for maintaining the amount by which the buckle 22 is retracted is small in accordance with the dimensional ratio of the small diameter portion 36 and the large diameter portion 34 of the pulley 32. Namely, even if the moving stroke of the piston 44 is small, the amount by which the buckle 22 is retracted can be sufficiently maintained. Accordingly, it becomes possible that the overall length of the cylinder 46 be shortened, and the present apparatus can be made small so that a large configuration space is not required.

As described above, in the buckle retractor 10 according to the present embodiment, the amount by which the buckle 22 is retracted can be sufficiently maintained and the small-size retractor can be realized so that the large configuration space is not required. Moreover, assembling efficiency does not deteriorate and the present retractor can also be used even in a small-size vehicle, so that an applicable range also extends.

It should be noted that, in the above-described embodiment, by replacing the small diameter portion 36 by a gear wheel and replacing the second wire 38 by a rack, tension of the piston 44 may be transmitted to the pulley 32 via the rack.

What is claimed is:

1. A tensioner which applies tension to a seat belt at a time of a sudden deceleration of a vehicle, comprising:

(a) a drive source for generating a drive stroke to apply a drive force at a time of a sudden deceleration of the vehicle;

(b) transmission means including an elongated member for transmitting said driving force of said drive source to a portion of the seat belt so as to apply a pulling tension to the seat belt; and (c) a stroke increasing means provided in said transmission means for increasing said drive stroke from said drive source such that the scat belt is pulled by a drive stroke longer than the drive stroke of said drive source, including a small diameter pulley connected to said drive source by said elongated member and a large diameter pulley connected to a portion of said sent belt by said elongated member, wherein the width of said large pulley is substantially the same as the width of said elongated member.

2. A tensioner according to claim 1, wherein said drive source pulls said elongated member of said transmission means by an explosive force and the elongated member transmits tension to a buckle of the seat belt.

3. A tensioner according to claim 1, wherein said elongated member includes two pieces of wire, one wire which is connected to said drive source and wound around said small diameter pulley and another wire which is connected to the seat belt and fixed to said large diameter pulley, wherein the width of said small diameter pulley is substantially the same as said one wire.

4. A tensioner according to claim 3, wherein one end of said one wire is fixed to the small diameter pulley after being partially wound around the small diameter pulley, and one end of said other wire is fixed to the large diameter pulley.

5. A tensioner according to claim 3, wherein said small diameter pulley and said large diameter pulley are coaxially connected to each other.

6. A tensioner according to claim 5, wherein one end portion of said two pieces of wire is respectively wound around said coaxial small diameter pulley and large diameter pulley in opposite directions, such that when one wire is pulled out from said small diameter pulley, said other wire is wound around said large diameter pulley.

7. A tensioner according to claim 3, further comprising reversion preventing means which prevents said wires from being retracted in a direction opposite to that of the pulling tension generated by said drive source.

8. A tensioner according to claim 7, wherein said reversion preventing means prevents rotation of said pulleys.

9. A tensioner according to claim 7, wherein said reversion preventing means includes a fastening pawl that engages with said pulleys so as to prevent rotation of said pulleys.

10. A tensioner according to claim 9, wherein said reversion preventing means allows rotation of said pulleys only in one direction by causing said ratchet pawl to engage with a ratchet wheel formed on an outer periphery of said pulleys.

11. A seat belt buckle retractor comprising:

(a) a drive source which is mounted on a vehicle body and which generates a drive stroke at a time of a sudden deceleration of a vehicle to create a driving force;

(b) transmission means including an elongated member for transmitting said driving force of said drive source to a portion of a seat belt so as to apply a pulling tension to the seat belt, and (c) stroke increasing means provided in said transmission means for increasing said drive stroke of said drive source and pulling a seat belt buckle so as to apply tension to a seat belt wherein the width of both said pulleys is substantially the same as said flexible member, said flexible member being wound around said small and large diameter pulleys no more than once, and (d) reversion preventing means which prevents movement of said seat belt buckle in a direction opposite to said direction in which said seat belt buckle is pulled.

12. A seat bolt buckle retractor according to claim 11, whereto said flexible member includes two pieces of wire, one end of each of these wires being respectively wound onto said small diameter pulley and said large diameter pulley.

13. A seat belt buckle retractor according to claim 12, wherein said two pulleys are coaxially connected to each other.

14. A seat belt buckle retractor according to claim 12, wherein said reversion preventing means prevents rotation of said two pulleys so as to prevent the buckle from reversing.

15. A buckle retractor which pulls a seat belt buckle at the time of a sudden deceleration of a vehicle and applies tension to a seat belt, comprising:

(a) a gas generator actuated at the time of a sudden deceleration of the vehicle;

(b) a cylinder which, when the generated gas is supplied to the cylinder, drives a piston;

(c) a first wire of which one end is connected to the piston so as to receive tension therefrom;

(d) a small diameter pulley on which said first wire is wound;

(e) a large diameter pulley connected to said small diameter pulley; and (f) a second wire of which one end is connected to said large diameter pulley and to which a pulling stroke of said first wire is increased and transmitted in an emergency situation of a vehicle, and another end of said second wire moving largely the seat belt buckle so as to apply tension to the seat belt, wherein the width of said small and large diameter pulley is substantially the same as said first and second wires. respectively.

16. A buckle retractor according to claim 15, wherein said small diameter pulley and said large diameter pulley are coaxially connected to each other.

17. A buckle retractor according to claim 16, further comprising a reversion preventing means for preventing said seat belt buckle from reversing.

* * * * *